H. D. POWNALL.

ICE MACHINE.

APPLICATION FILED MAY 10, 1913.

Reissued Nov. 30, 1915.

14,022.

3 SHEETS—SHEET 1.

Witnesses

W. Thornton Bogert

C. R. Throff

Inventor

Henry D. Pownall

By C. W. Miles

Attorney

H. D. POWNALL.

ICE MACHINE.

APPLICATION FILED MAY 10, 1913.

Reissued Nov. 30, 1915.

14,022.

3 SHEETS—SHEET 2.

Inventor

Henry D. Pownall

Witnesses

A. Thornton Bogert

B. R. Broff

By C. W. Miles

Attorney

H. D. POWNALL.

ICE MACHINE.

APPLICATION FILED MAY 10, 1913.

Reissued Nov. 30, 1915. 14,022.

3 SHEETS SHEET 3.

Inventor

Henry D. Pownall

Witnesses

W. Thornton Bogert

C. R. Kropff.

By C. W. Miles

Attorney

UNITED STATES PATENT OFFICE.

HENRY D. POWNALL, OF CANTON, OHIO.

ICE-MACHINE.

14,022. Specification of Reissued Letters Patent. Reissued Nov. 30, 1915.

Original No. 982,518, dated May 16, 1911, Serial No. 568,774. Application for reissue filed May 10, 1913. Serial No. 766,902.

*To all whom it may concern:*

Be it known that I, HENRY D. POWNALL, residing at Canton, in the county of Stark and State of Ohio, and a citizen of the United States, have invented certain new and useful Improvements in Ice-Machines, of which the following is a specification.

My invention relates to improvements in ice machines.

One of its objects is to provide an improved brine tank and can system adapted to employ raw water as distinguished from distilled water in making ice.

Another object is to provide an improved arrangement of the ice cans in a brine tank with means to supply raw water to said cans and remove impurities from the water during the process of freezing.

Another object is to provide improved means to thaw or loosen the blocks of ice from the cans economically.

Another object is to provide for maintaining a uniform level of water in the ice cans and to prevent freezing of the water at the points where it is introduced into the cans.

Figure 1:
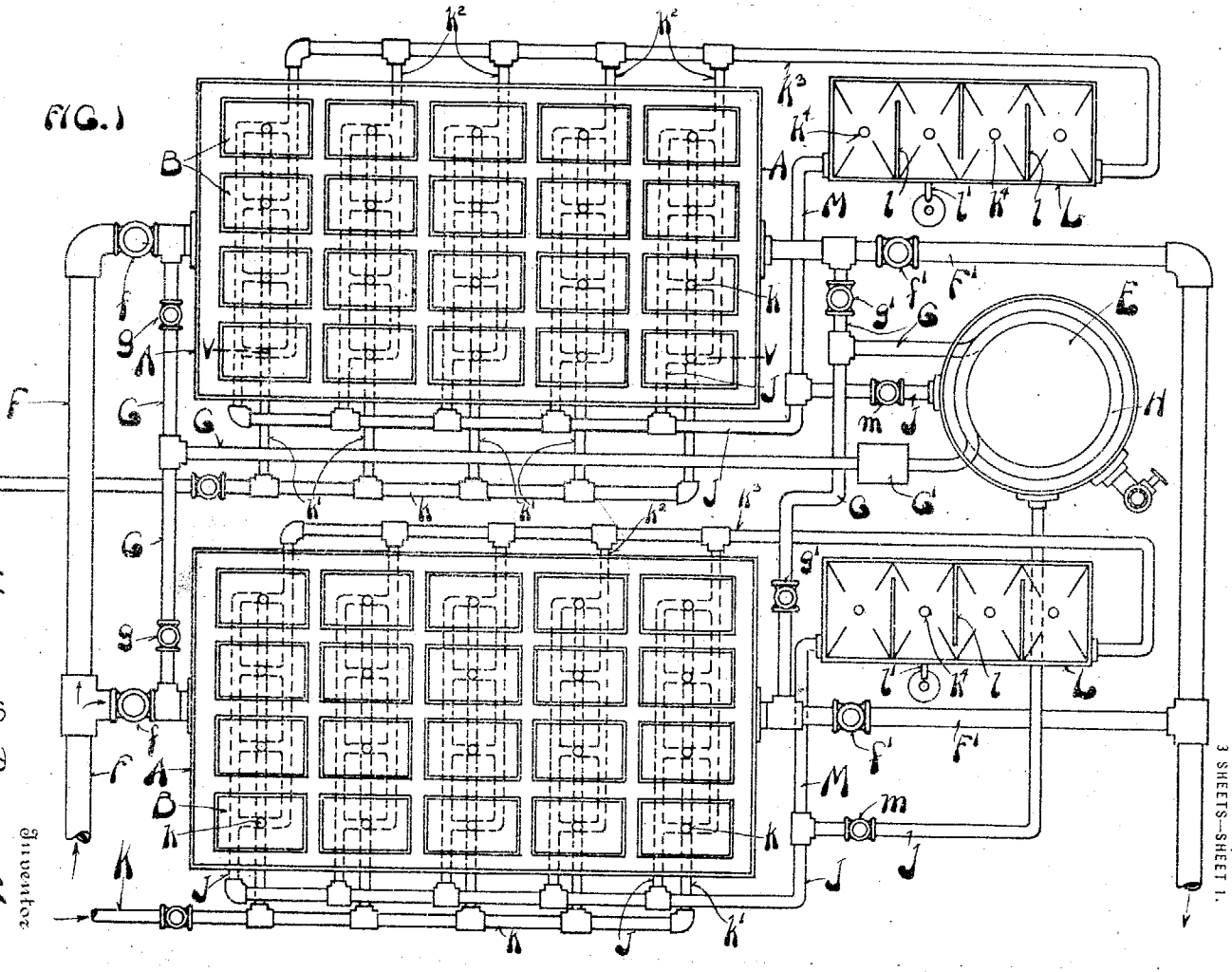
Figure 2:
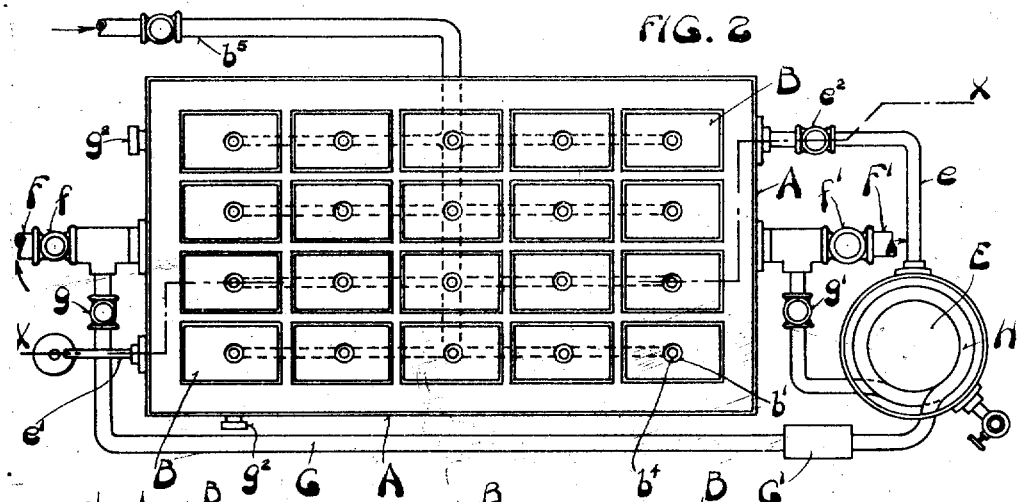
Figure 3:
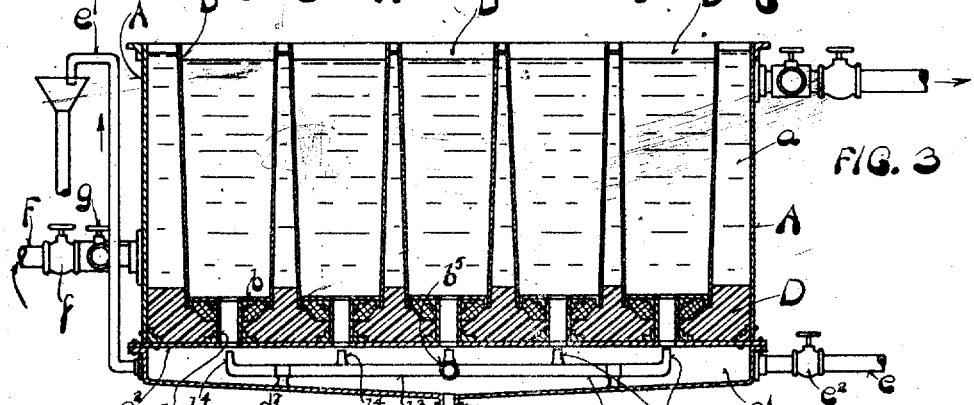
Figure 4:
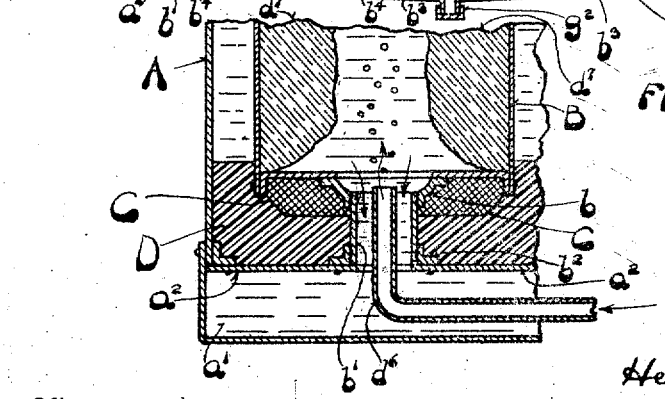
Figure 5:
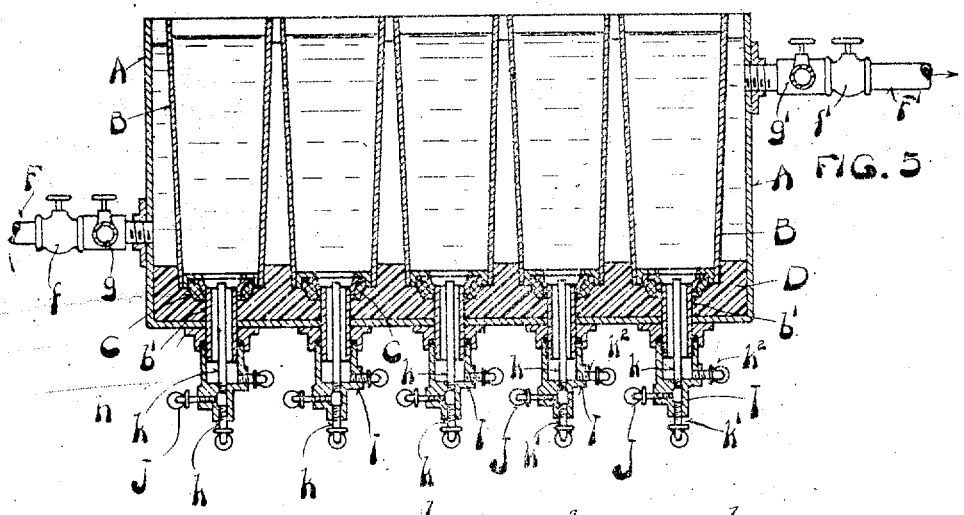
Figure 6:
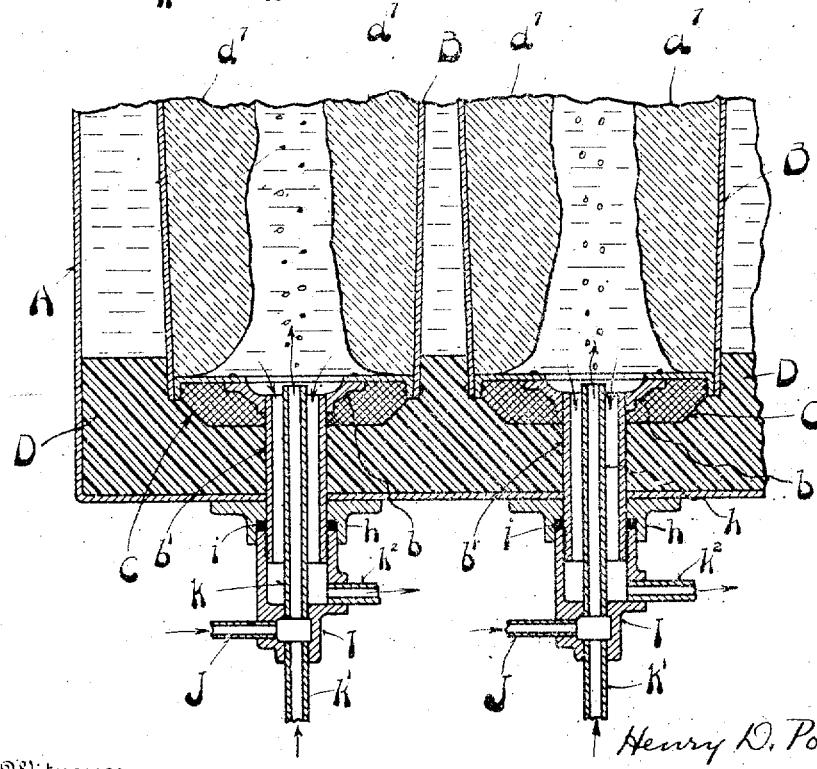

It further consists in certain details of form, combination and arrangement, all of which will be more fully set forth in the description of the accompanying drawings, in which:

Figure 1 is a top plan view of two brine tanks or units embodying one form of my invention. Fig. 2 is a similar view of one brine tank embodying another form of my invention. Fig. 3 is a vertical section on line $x$ $x$ of Fig. 2. Fig. 4 is an enlarged sectional detail illustrating a modification of Fig. 3. Fig. 5 is a vertical section on line $v$ $v$ of Fig. 1. Fig. 6 is an enlarged detail section similar to Fig. 5.

My invention is capable of several modifications or embodiments. As illustrated in Figs. 2, 3, and 4, A represents a brine tank which has a main or upper compartment $a$ and a lower compartment $a'$. B represents a series of ice cans, which may be of ordinary construction except that they are each provided with a flange $b$ at the bottom by means of which they are connected by pipes $b'$ and flanges $b^2$ with the partition wall $a^2$ which divides the compartments $a$ $a'$ from each other. The pipes $b'$ form connections between the cans and the compartment $a'$ for the admission of raw water from the compartment $a'$ to the cans, and also for the admission of air currents or jets to each can, which air currents are supplied through reduced nozzles $b^4$ carried by the pipes $b^3$, which are branched from and supplied with air from the main air pipe $b^5$. The bottoms of the respective cans are preferably protected by blocks $c$ of cork insulation, or other insulating material. After the cans have been assembled and connected in the brine tank a body D of pitch, or other material of insulating properties, and which can be introduced in a semi-fluid condition is introduced to a point above the bottom of the respective cans, which body D when solidified forms a water tight insulation to protect the water in the pipes $b'$ and compartment $a^2$ from freezing, and to prevent the water from freezing as rapidly at the bottom of the cans as at other parts of the cans. Raw water is supplied from the storage tank E through pipe $e$ to compartment $a'$ from which it rises in the cans until it reaches the height of the overflow pipe $e'$ when the main supply of water is shut off at valve $e^2$ leaving only a slight flow, which escapes at the overflow, and thus serves to maintain a uniform level of water in the ice cans. Cold brine is admitted to the brine tank compartment $a$ by means of brine pipe F and surrounds the cans to about the same level as the water in the cans. The brine is removed from the tank A by pipe F' and returned to a brine cooler of ordinary construction, where it is again cooled, and is thus continuously circulated through the brine tank A and brine cooler until the water in the cans B is completely frozen with the exception of small cores at the bottom over the pipes $b'$. Metal hooks are frozen into the upper part of the ice blocks by means of which the blocks can be lifted from the cans. In order to thaw or loosen the ice blocks from the cans, the valves $f$ $f'$ in the brine circulating pipes F F' are closed and the valves $g$ $g'$ in the pipe line G opened. A circulating pump G' circulates the brine from the brine tank through the pipe G and a coil H in the storage tank E, which serves to cool the next charge of water in the tank E, and at the same time to raise the temperature of the brine surrounding the cans B so as to loosen the ice blocks and permit them to be removed. The cans are then refilled with the cooled water from the tank E, the valves $g$ $g'$ closed and the valves $f$ $f'$ opened to reëstablish a circulation of cold brine through the brine tank. During the freezing operation the air currents in the cans serve to agitate the water in the cans and to detach any air bubbles formed on the freezing surface and also any particles of solid matter, thus securing clear ice free from dirt or bubbles. Any solid matter which may find its way to the cans finally settles to the bottom and thence through the pipes $b'$ to the bottom of the compartment $a'$ from whence it can be blown out from time to time through the blow-off pipes $g^2$. As illustrated in Fig. 4 the air jets $d^6$ are extended into the pipes $b'$ nearly to the bottom of the cans. Fig. 4 also indicates the manner in which the ice $d^7$ forms more heavily along the sides than at the bottom of the cans.

In the modification Figs. 1, 5, and 6, the cans are arranged in the respective brine tanks and insulated at the bottom as heretofore described. The pipes $b'$ pass through the bottom of the tanks and through flanges $h$ attached to the under side of the tanks, and are threaded to the coupling members I which are thereby drawn up tightly upon the packing rings $i$ to make tight joints with the flanges $h$. Raw water is supplied by main pipe J and branch pipes $j$ from the storage tank E to the coupling members I and thence to the respective cans by pipes $k$. Air is also introduced to pipes $k$ by means of the main air pipe K and branch air pipes $k'$ which are connected to the coupling member I. The surplus water supplied from the storage tank, and also the water drawn from pipes $j$ into pipe $k$ by the air current flow downwardly around pipe $k$ in the pipes $b'$ and by branch pipes $k^2$ and main pipe $k^3$ are delivered into a settling chamber or reservoir where solid impurities are settled and blow off through blow off pipes $k^4$. The current of water in the reservoir L is obstructed by baffle plates $l$. Any excess of water escapes from the reservoir L by means of an overflow pipe $l'$, thus maintaining a uniform water level in the cans. From the reservoir L the water is returned by pipe M to the pipes J $j$, thus maintaining a constant circulation of raw water through the respective cans and thence through the settling reservoir, and preferably a slight continuous overflow at $l'$, due to the valve $m$ from the tank E being left slightly open. The blocks of ice are loosened and removed from the cans as heretofore described. As many separate brine tanks or units of convenient size may be employed and operated in series as desired, and the number of cans in the brine tanks varied.

With the apparatus herein illustrated and described I am enabled to employ raw water, to secure clear ice free from bubbles or solid particles, to employ cans of ordinary construction, to prevent freezing of the water supply pipes leading to the cans, to maintain a uniform level in the cans, and to conveniently fill the cans and release and remove the ice, and to greatly reduce the labor required, and the first cost of the apparatus.

The mechanism herein illustrated and described is capable of considerable modification without departing from the principle of my invention.

Having described my invention, what I claim is:

1. In an ice machine, a brine tank through which a cooling medium is adapted to be circulated, a series of ice cans located in said brine tank, conduits from the lower portion of said cans to the outside of said tank, a body of plastic insulating material occupying the lower portion of said tank and surrounding the lower portion of said cans and said conduits leading thereto, and means to supply water and air through said conduit to said cans.

2. In an ice machine, a brine tank through which a cooling medium is adapted to be circulated, an ice can located in said brine tank, a conduit from the lower portion of said can to the outside of said tank, a body of plastic insulating material occupying the lower portion of said tank and surrounding the lower portion of said can and said conduit leading thereto, and means to supply water through said conduit to said can.

3. In an ice machine, a brine tank through the upper portion of which a cooling medium is adapted to be circulated, an ice can located in said brine tank and having its lower portion embedded in a plastic insulating material, and a water supply conduit leading from the bottom of said ice can through the bottom of said brine tank and inclosed in insulating material.

4. In an ice machine, a brine tank through which a cooling medium is adapted to be circulated, an ice can located in said brine tank and having its lower portion embedded in an insulating material, and a water circulating conduit leading from the bottom of said ice can through the bottom of said tank and inclosed in insulating material, and means to circulate water through said conduit to and from said can.

5. In an ice machine, a brine tank, valve controlled pipes adapted to circulate a cooling medium through said tank, an ice can located in said brine tank, a conduit leading from the lower portion of said can to the outside of said brine tank, a body of insulating material protecting the lower portion of said can and said conduit from contact with said cooling medium, a by-pass brine circuit and means to raise the temperature of the brine to detach the ice block from the can.

6. In an ice machine, a brine tank, valve controlled pipes adapted to circulate a cooling medium through said tank, a conduit leading from said can to the outside of said brine tank, a body of insulating material protecting the lower portion of said can and said conduit from contact with said cooling medium, and means to raise the temperature of the cooling medium contained in the brine tank when the circulation of the cooling medium is interrupted to release the ice from the can.

7. In an ice machine, a brine tank, valve controlled pipes adapted to circulate a cooling medium through said tank, an ice can located in said brine tank, a conduit leading from the lower portion of said can to the outside of said brine tank, a body of insulating material protecting the lower portion of said can and said conduit from contact with said cooling medium, a water storage tank from which said can is adapted to be filled through said conduit, and means to circulate the cooling medium from said brine tank, after the circulation of said cooling medium has been interrupted, through said storage tank, to cool the water in the storage tank and raise the temperature of the cooling medium in the brine tank to release the ice from the can.

8. In an ice machine, a brine tank, through which a cooling medium is adapted to be circulated, an ice can located in said brine tank, a conduit leading from the lower portion of said can to the outside of said tank and forming a water inlet to and exit from said can, an insulating material protecting the lower portion of said can and said conduit from contact with said cooling medium, and a conduit supplying air under pressure to said water conduit to maintain a water circulation to and from said can.

9. In an ice machine, a brine tank through which a cooling medium is adapted to be circulated, a plurality of ice cans located in said tank, members each comprising water inlet and exit conduits leading from the exterior of said tank to the lower portion of the respective cans, insulating material protecting the lower portion of said cans and said conduit members from contact with said cooling medium, and means to supply air under pressure to the inlet conduits of the respective cans to cause a circulation of water to and from said cans.

10. In an ice machine, a brine tank through which a cooling medium is adapted to be circulated, a plurality of ice cans located in said tank, members each comprising water inlet and exit conduits leading from the exterior of said tank to the lower portion of said respective cans, an insulating material protecting the lower portion of said cans and said conduit members from the refrigerating action of said cooling medium, and means to cause a circulation of water to and from said respective cans.

11. In an ice machine, a cooling tank in which a cooling medium is to be circulated, an ice can located in said tank and open at the top, fresh water inlet and exit conduits tapping the bottom of said ice can, and means to supply air under pressure to said inlet conduit to maintain a circulation of fresh water through said ice can during the freezing operation.

12. In an ice machine, a cooling tank to contain a liquid cooling medium, a plurality of ice cans open at the top located in said tank and exposed through their side walls only to said cooling medium, fresh water inlet conduits leading to the lower portion of said respective ice cans, fresh water exit conduits leading from said respective cans, and means to maintain a circulation of fresh water through said conduits to and from said respective ice cans during the freezing operation.

13. In an ice machine, a cooling tank to contain a cooling medium, an ice can located in said tank, a fresh water settling reservoir located outside the cooling tank, a fresh water inlet conduit leading from said reservoir to the lower portion of said ice can, a fresh water exit conduit leading from said ice can to said reservoir, and means to circulate fresh water through said conduits to and from said ice can during the freezing operation.

14. In an ice machine, a cooling tank in which a cooling medium is to be circulated, an ice can located in said tank, a fresh water settling reservoir located outside the cooling tank, fresh water inlet and exit conduits connecting the lower portion of said ice can with said settling reservoir, an overflow conduit to maintain a uniform liquid level in said can and settling reservoir, and means to circulate fresh water through said inlet and exit conduits to and from said ice can during the freezing operation.

15. In an ice machine, a cooling tank in which a cooling medium is to be circulated, an ice can located in said cooling tank, fresh water inlet and exit conduits leading from the exterior of said tank to the lower portion of said can, an insulating material located in the lower portion of said cooling tank and protecting the lower portion of said can and said conduits from the refrigerating action of said cooling medium, and means to supply air under pressure to said inlet conduit to cause a circulation of fresh water to and from said ice can.

16. In an ice machine, a cooling tank, valve controlled pipes to circulate a cooling medium through said tank, a plurality of ice cans located in said tank and having their side walls in contact with said cooling medium, fresh water inlet and exit conduits leading to and from said respective cans and protected from the refrigerating action of said cooling medium, a fresh water supply tank, a coil in said supply tank, a valve controlled conduit connecting said cooling tank to said coil in the supply tank, and means to circulate the cooling medium from said cooling tank through said coil.

17. In an ice machine, a cooling tank in which a cooling medium is to be circulated, an ice can located in said tank, a fresh water settling reservoir located outside the cooling tank, inlet and exit conduits connecting said settling reservoir with the lower portion of said can, means to protect the lower portion of said can, and said conduits from the refrigerating action of said cooling medium, and means to circulate water from said reservoir to and from said can.

18. In an ice machine, a tank in which a cooling medium is to be circulated, a series of ice cans located in said tank, conduits from the lower portion of said cans to the outside of said tank, a body of insulating material which is substantially solid at the temperatures employed in refrigeration and plastic at higher temperatures, occupying the lower portion of said tank and surrounding the lower portion of said cans to protect the lower portion of said cans from the refrigerating action of the cooling medium, and means to supply water and air through said conduits to said cans.

19. In an ice machine, a tank in the upper portion of which a cooling medium is to be circulated, an ice can open at the top located in said tank and having its lower portion embedded in an insulating material which is substantially solid at the temperatures employed in refrigeration and plastic at higher temperatures, and a water supply conduit leading to the lower portion of said ice can through the bottom of said tank and protected from the refrigerating action of said cooling medium by said insulating material.

20. In an ice machine, a brine tank in which a cooling medium is to be circulated, a series of ice cans located in said tank, and a body of insulating material which is substantially solid at the temperatures employed in refrigeration and plastic at higher temperatures occupying the lower portion of said tank and in which the bottoms of said cans are embedded to seal the can and tank joints and provide an insulation beneath for the cooling medium.

21. In an ice machine, a tank in which a cooling medium is to be circulated, an ice can located in said tank, a fresh water conduit leading from the lower portion of said can to the outside of said tank and protected by insulating material from the refrigerating action of said cooling medium, a fresh water storage reservoir to supply water through said conduit to said can, and means to transfer heat from said fresh water to the cooling medium of said tank to cool said fresh water supply for said can and raise the temperature of the cooling medium of said tank to release the ice from the can.

22. In an ice machine, a tank in which a cooling medium is to be circulated, a plurality of ice cans located in said tank and exposed through their side walls to the refrigerating action of said cooling medium, fresh water inlet and exit conduits leading from the lower portion of said cans to the exterior of said tank and protected by insulation from the refrigerating effect of said cooling medium, and means to cause a circulation of fresh water to and from said respective cans during the freezing operation.

23. In an ice machine, a tank in which a cooling medium is to be circulated, a plurality of ice cans located in said tank and exposed through their side walls to the refrigerating action of said cooling medium, fresh water conduits leading to the lower portion of said respective cans from the exterior of said tank and protected by insulation from the refrigerating action of said cooling medium, and a fresh water overflow to maintain a uniform fresh water level in said respective cans.

24. In an ice machine, a tank in which a cooling medium is to be circulated, one or more ice cans open at the top located in said tank and exposed through their side walls to the refrigerating action of said cooling medium, fresh water inlet conduits to the bottoms of said cans to supply water to said ice cans and protected from the refrigerating action of said cooling medium, means to supply fresh water to said ice cans through said conduits and a fresh water overflow to maintain a uniform fresh water level in said respective cans.

In testimony whereof I have affixed my signature in presence of two witnesses.

HENRY D. POWNALL.

Witnesses:
C. W. MILES,
W. THORNTON BOGERT.